(12) United States Patent
Morikawa

(10) Patent No.: US 11,853,822 B2
(45) Date of Patent: Dec. 26, 2023

(54) PRINTING DEVICE, CONTROL METHOD FOR PRINTING DEVICE, AND NON-TRANSITORY COMPUTER-READABLE RECORDING MEDIUM THEREFOR

(71) Applicant: Brother Kogyo Kabushiki Kaisha, Nagoya (JP)

(72) Inventor: Shota Morikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/067,786

(22) Filed: Dec. 19, 2022

(65) Prior Publication Data

US 2023/0289549 A1    Sep. 14, 2023

(30) Foreign Application Priority Data

Jan. 31, 2022    (JP) ................. 2022-013433

(51) Int. Cl.
*G06K 15/02* (2006.01)
*G06K 15/10* (2006.01)
*H04N 1/60* (2006.01)

(52) U.S. Cl.
CPC ......... *G06K 15/027* (2013.01); *G06K 15/102* (2013.01); *H04N 1/6033* (2013.01)

(58) Field of Classification Search
CPC ... G06K 15/027; G06K 15/102; H04N 1/6033
See application file for complete search history.

(56) References Cited

U.S. PATENT DOCUMENTS

| | | | |
|---|---|---|---|
| 6,897,978 B1 | 5/2005 | Ohta | |
| 2009/0168084 A1 | 7/2009 | Seto | |
| 2011/0058196 A1* | 3/2011 | Teraue | H04N 1/6058 358/1.9 |
| 2013/0021620 A1 | 1/2013 | Doi | |
| 2016/0023472 A1* | 1/2016 | Arizono | H04N 1/6033 347/15 |

FOREIGN PATENT DOCUMENTS

| | | |
|---|---|---|
| JP | 2000-103147 A | 4/2000 |
| JP | 2005-136645 A | 5/2005 |
| JP | 2009-164835 A | 7/2009 |
| JP | 2013-039826 A | 2/2013 |
| JP | 2013-198079 A | 9/2013 |
| JP | 2014-159103 A | 9/2014 |

* cited by examiner

*Primary Examiner* — Quang N Vo
(74) *Attorney, Agent, or Firm* — BURR PATENT LAW, PLLC

(57) ABSTRACT

A printing device comprises a head including nozzles configured to eject ink and is configured to print, with use of the ink, an image having a plurality of pixels on a printing medium, an input device configured to receive information designating a pixel in the image, and a controller. The controller performs judging a priority of a designated color of a designated pixel designated by the information designating the pixel, determining one of conditions including a number, sizes, and the number and sizes of the designated patches of the designated color, based on the priority judged by the judging, and printing a patch chart containing the designated patch according to the one of the conditions on the printing medium.

14 Claims, 11 Drawing Sheets

| No | COLOR VALUE | | | POSITION | | ORDER OF DESIGNATION | NUMBER OF PIXELS | TOTAL NUMBER | TOTAL ORDER | RATIO (%) |
|---|---|---|---|---|---|---|---|---|---|---|
| | R | G | B | x | y | | | | | |
| 1 | 255 | 160 | 32 | x1 | y1 | 1 | 2 (160) | 4 (10) | 2 (7) | 27 |
| 2 | 255 | 176 | 80 | x2 | y2 | 2 | 4 (10) | 2 (28) | 3 (8) | 23 |
| 3 | 255 | 160 | 80 | x3 | y3 | 3 | 1 (300) | 1 (35) | 1 (5) | 33 |
| 4 | 255 | 144 | 80 | x4 | y4 | 4 | 3 (20) | 3 (24) | 4 (10) | 17 |

FIG. 6 y DIRECTION / x DIRECTION

PRINTING DEVICE, CONTROL METHOD FOR PRINTING DEVICE, AND NON-TRANSITORY COMPUTER-READABLE RECORDING MEDIUM THEREFOR

REFERENCE TO RELATED APPLICATIONS

This application claims priority from Japanese Patent Application No. 2022-013433 filed on Jan. 31, 2022. The entire content of the priority application is incorporated herein by reference.

BACKGROUND ART

The present disclosures relate to a printing device, a control method for the printing device, and a non-transitory computer-readable recording medium containing instructions realizing a program for controlling the printing device.

DESCRIPTION

Conventionally, there has been known an image processing device that is configured to print a plurality of particular color patches on a printing medium, measure the printed color patches, and obtain a plurality of colorimetric values. Such a conventional image processing device is configured to extract a color patch of which colorimetric value is close to the color of the pixel in the image data for printing from among the plurality of colorimetric values, and converts the color of the image data for printing based on the extracted colorimetric value of the color patch.

In the conventional image processing device as described above, the color of the image data for printing is calibrated based on the colorimetric value of a particular color patch. However, with the particular color patch, an appropriate color calibration in accordance with the user's intent may not be performed.

According to aspects of the present disclosure, there is provided a printing device including a head including nozzles configured to eject ink and is configured to print, with use of the ink, an image having a plurality of pixels on a printing medium, an input device configured to receive information designating a pixel in the image, and a controller. The controller is configured to perform judging a priority of a designated color of a designated pixel designated by the information designating the pixel, determining one of conditions including (a) a number of designated patches of the designated color, (b) sizes of the designated patches of the designated color, and (c) the number and sizes of the designated patches of the designated color, based on the priority judged by the judging, and printing a patch chart containing the designated patch according to the one of the conditions determined in the determining on the printing medium.

According to aspects of the present disclosure, there is provided a printing method of controlling a printing device having a head including nozzles configured to eject ink and is configured to print, with use of the ink, an image having a plurality of pixels on a printing medium, an input device configured to receive information designating a pixel in the image. The printing method comprises judging a priority of a designated color of a designated pixel designated by the information designating on the pixel, determining one of conditions including (a) a number of designated patches of the designated color, (b) sizes of the designated patches of the designated color, and (c) the number and sizes of the designated patches of the designated color, based on the priority judged by the judging, and printing a patch chart containing the designated patch according to the one of the conditions determined in the determining on the printing medium.

According to aspects of the present disclosure, there is provided a non-transitory computer-readable storage medium for a printing device having a head including nozzles configured to eject ink and is configured to print, with use of the ink, an image having a plurality of pixels on a printing medium, an input device configured to receive information designating a pixel of in image and a computer. The non-transitory computer-readable storage medium containing computer-executable instructions which cause, when executed by the computer, the printing device to perform judging a priority of a designated color of a designated pixel designated by the information designating on the pixel, determining one of conditions including (a) a number of designated patches of the designated color, (b) sizes of the designated patches of the designated color, and (c) the number and sizes of the designated patches of the designated color, based on the priority judged by the judging, and printing a patch chart containing the designated patch according to the one of the conditions determined in the determining on the printing medium.

FIG. 1 schematically shows a configuration, viewed from the above, of a printing device according to an embodiment and a modification of the present disclosures.

FIG. 6 is an example of a designated pixel list.

Configuration of Printing Device

Figure 1:
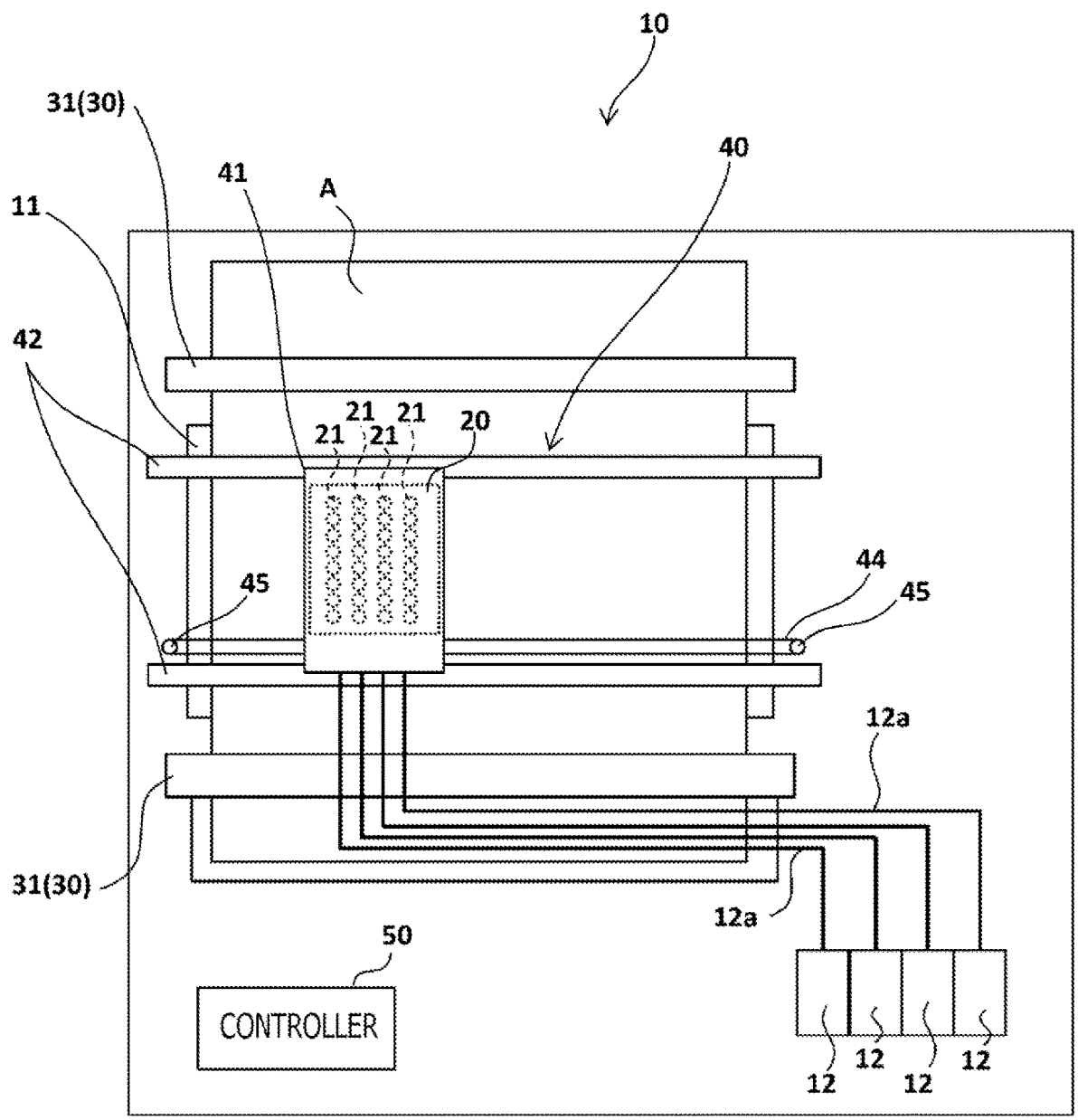
Figure 2:
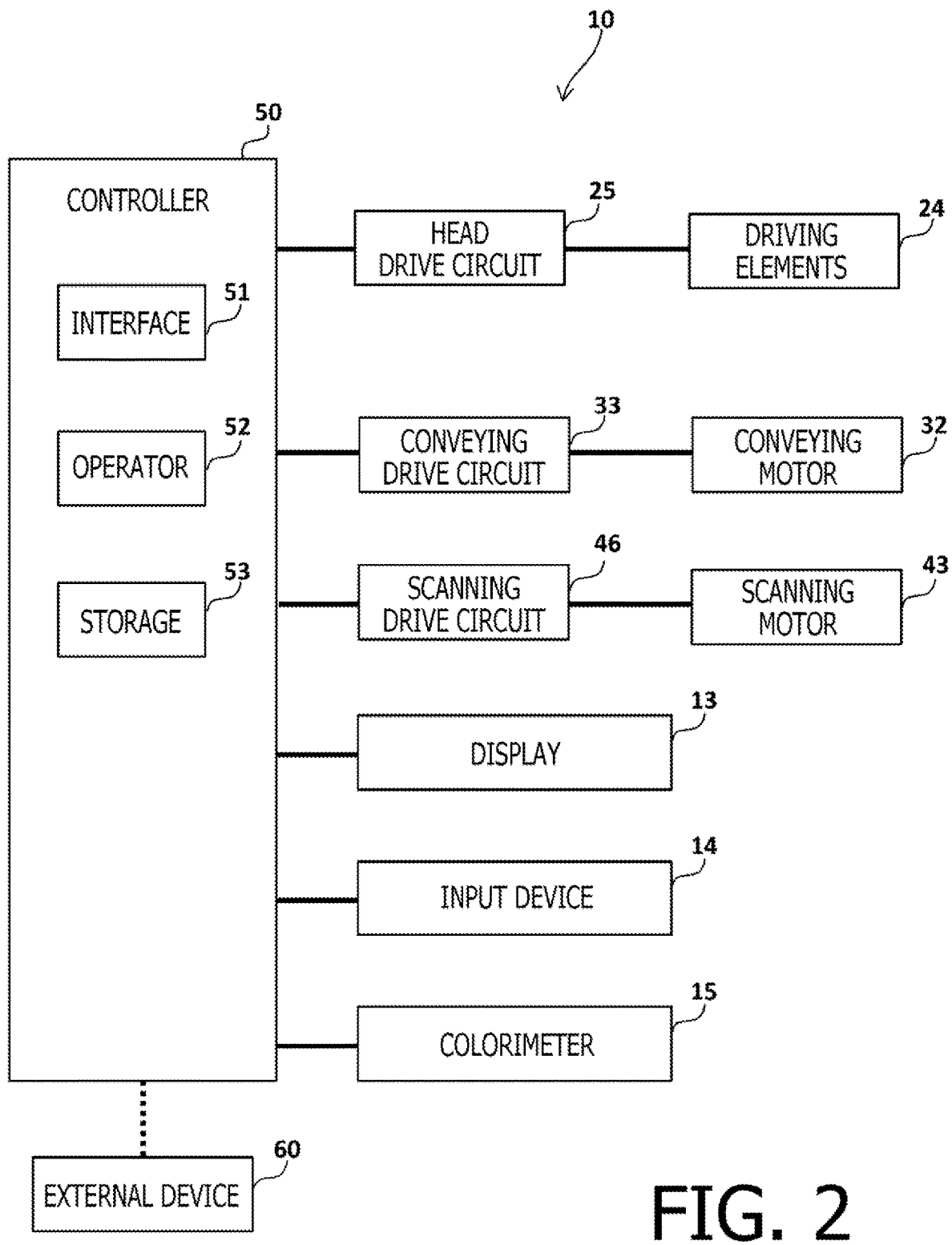
FIG. 2 shows a block diagram illustrating a functional configuration of the printing device.

As shown in FIGS. 1 and 2, a printing device 10 according to an embodiment of the present disclosures is a device configured to eject ink from nozzles 21 formed on a head 20 onto a printing medium A to print an image E on the printing medium A with the ink. In the following description, an example in which an inkjet printer is used as the printing device 10 will be described. However, the printing device 10 is not necessarily limited to the inkjet printer as described. Further, the printing medium A is, for example, a sheet of paper, cloth, or the like.

The printing device 10 is of a serial head system and is equipped with the head 20, a platen 11, tanks 12, a display 13, an input device 14, a colorimeter 15, a conveyor 30, a movable device 40, and a controller 50. The controller 50 is connected to a head drive circuit 25, a conveying drive circuit 33 and a scanning drive circuit 46.

In the following description, a first direction in which the printing medium A is conveyed by the conveyor 30 will be referred to as a front-rear direction. A second direction in which the head 20 is moved by the movable device 40 will be referred to as a right-left direction. A direction intersecting with (e.g., perpendicular to) both the front-rear direction and the right-left direction) will be referred to as an up-down direction.

It is noted, however, the arrangement of the printing device 10 is not necessarily limited to the above. The printing device 10 may be of a line-head type. In such a case, the printing device 10 is not provided with the movable device 40. Further, the head 20 is configured not to move, but have a length longer than a length, in the right-left direction, of the printing medium A.

The head 20 has a plurality of nozzles 21 and a plurality of driving elements 24. The nozzles 21 are opened on a lower surface of the head 20. The driving elements 24 are piezoelectric elements, exothermic elements, electrostatic actuators, or the like, which are provided corresponding to respective nozzles 21 and apply pressure to the ink in such a manner that the ink is ejected from the nozzles 21. The platen 11 has a planar upper surface and defines a distance between the printing medium A placed on the upper surface and a lower surface of the head 20 provided to face the platen 11. The number of the tanks 12 is equal to the number of ink colors and is, for example, four. The four tanks 12 store cyan ink, yellow ink, magenta ink, and black ink, respectively. Each tank 12 is connected to the head 20 by a tube 12*a*, and supplies ink to the nozzles 21 of the head 20 via the tube 12*a*.

The conveyor 30 has two conveying rollers 31 and a conveying motor 32. The two conveying rollers 31 are arranged to sandwich the platen 11 therebetween in the front-rear direction. Each roller 31 has a shaft extending in the right-left direction, and the shaft is connected to the conveying motor 32. Each conveying roller 31 rotates about the shaft as the conveying motor 32 is driven, thereby conveying the printing medium A in the front-rear direction on the platen 11.

The movable device 40 has a carriage 41, two guide rails 42, a scanning motor 43 (shown in FIG. 2), pair of pulleys 45 and an endless belt 44. The carriage 41 mounts the head 20, and is supported by the two guide rails 42 so as to be movable in the right-left direction. The two guide rails 42 extend in the right-left direction above the platen 11 so as to sandwich the head 20 therebetween in the front-rear direction. The endless belt 44 extends in the right-left direction, attached to the carriage 41, and is wound around the pair of pulleys 45. One of pair of pulleys 45 is connected to the scanning motor 43. When the scanning motor 43 is driven, one of the pulleys 45 is driven to rotate, the endless belt 44 starts moving, and the carriage 41 reciprocates in the right-left direction along the guide rails 42. In this way, the carriage 41 moves the head 20 in the right-left direction.

Controller, Displaying Device, Input Device and Colorimeter

As shown in FIG. 2, the controller 50 is, for example, a computer which includes an interface 51, an operator 52, and a storage 53. The interface 51 is configured to receive various data such as image data and target color data from external devices 60 such as the computer, a camera, a communication network, a recording medium, the display, a printer and the like. The image data is, for example, raster data representing an image E to be printed on the printing medium A. The controller 50 may be configured by a single device or multiple devices which are arranged to be distributed and configured to cooperate with each other to perform an operation of the printing device 10.

The storage 53 is a memory that can be accessed from the operator 52, and is configured to include a RAM and a ROM. The RAM is configured to temporarily store various data such as the image data and data converted by the operator 52. The ROM is configured to store programs for performing various data processing and particular data. It is noted that the programs may be stored in recording media (e.g., a CD-ROM) which is external recording media different from the storage 53 and accessible from the operator 52.

The operator 52 includes a processor (e.g., a CPU), or a circuit such as an integrated circuit (e.g., ASIC). The operator 52 controls components of the printing device 10 and performs various operations such as a printing operation by executing the programs. The various operations will be described in detail later.

The controller 50 configured as above is electrically connected to the display 13, the input device 14 and the colorimeter 15. The display 13 (e.g., an LCD) is configured to display the image E to be printed by the printing operation under the control of the controller 50. The input device 14 (e.g., operational buttons, a mouse) is operated by a user to input data into the controller 50. The input device 14 may include a touchscreen panel integrated with the display 13. The input device 14 may be an interface 51 via which information is input externally. The colorimeter 15 (e.g., a spectrophotometer) is configured to measure the colors in the image E formed on the printing medium A and input the measured colors to the controller 50.

The controller 50 is electrically connected to the conveying motor 32 of the conveyor via the conveying drive circuit 33 which is configured to control the drive of the conveying motor 32. Thus, the conveyance of the printing medium A by the conveyor 30 is controlled. Further, the controller 50 is electrically connected to the scanning motor 43 of the movable device 40 via the scanning drive circuit 46 which is configured to control the drive of the scanning motor 43. Thus, the movement of the head 20 by the movable device 40 is controlled.

Further, the controller 50 is electrically connected to the driving elements 24 via the head drive circuit 25. The controller 50 outputs a control signal of the driving elements 24 to the head drive circuit 25, and the head drive circuit 25 generates the driving signals based on the control signal and outputs the same to the driving elements 24, respectively. The driving elements 24 are driven in accordance with the driving signals, thereby the ink (i.e., ink droplets) being ejected from the nozzles 21.

Printing Operation

In such a printing device 10, the controller 50 obtains the image data and performs printing operations in accordance with the image data. For example, the controller 50 may cause the head 20 to move rightward or leftward, while causing the head 20 to eject the ink toward the printing medium A. At the same time, the controller 50 causes the printing medium A to be moved frontward. In this way, the printing device 10 alternately repeats the movement of the head 20 and the ejection of the ink, and the conveyance of the printing medium A, thereby advancing the printing operation to print the image E on the printing medium A with the ink.

Control Method for Printing Device

Figure 3:
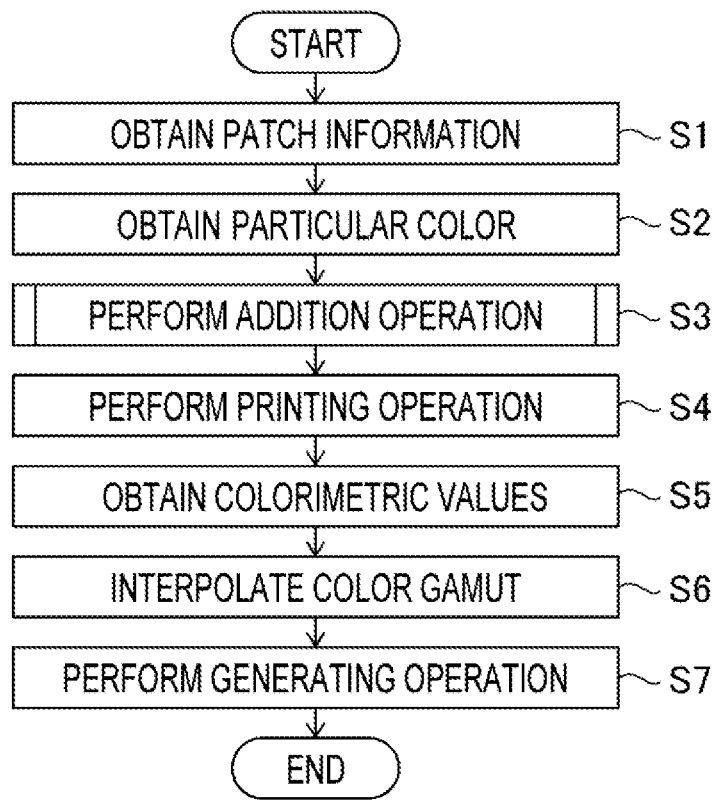
FIG. 3 shows a flowchart illustrating an example of a controlling method for the printing device.

The control of the printing device 10 is performed by the controller 50 in accordance with, for example, a control method indicated by a flowchart shown in FIG. 3. In S1, the controller 50 obtains patch information. The patch information may be input to the controller 50 via the input device 14 and the interface 51. Alternatively, the patch information may be defined in advance and obtained from the storage 53 or the like.

The patch information includes a size of the patch to be printed. The patch is a color chart for color calibration and has a particular shape. The patch includes, for example, a particular patch bn and a designated patch c. The size of the particular patch bn has a size that enables color measurement by the colorimeter 15, and may be determined in advance depending on the resolution of the colorimeter 15. The size of the designated patch c is determined by a determining operation described later.

Next, the controller 50 obtains a particular color which is the color of a particular patch group B (S2). The particular patch group B includes multiple types of particular patches bn. The particular color, which is the color of the particular patches bn, is determined in advance in the color list, which is stored in the storage 53. The particular color is a color that represents a stepwise color gamut, which is a region of color that can be printed by the printing device 10, and has device-dependent color coordinates, for example, RGB values in the RGB color space. For example, the particular color is a color that represents the color gamut of the printing device 10 in particular increments, such as RGB values of (0, 0, 0) through (255, 255, 255), in increments of 32, and includes $(256/32+1)3=729$ different colors. In this case, in the particular patch bn, n is a natural number between 1 and 729, and the particular patch group B has 729 different particular patches bn, that is, particular patches from b1 to b729.

The 729 particular colors are determined, for example, for each color difference of a particular threshold. Multiple particular colors have a color difference from each other that is equal to or greater than the particular threshold. The smallest color difference between two particular colors is equal to the particular threshold. The particular threshold is a value greater than zero, and the 729 particular colors are different from each other. The color difference is a difference between a color value and another color value. For example, the color difference is expressed in terms of inter-color distance, which is a distance between two color coordinates when RGB values are expressed in color coordinates in the RGB color space composed of a linear three-dimensional space of R, G, and B axes. The greater the color difference in two colors, the greater the inter-color distance between the two RGB values and the easier it is to distinguish between the two colors.

The controller 50 then performs an addition operation to add the designated color, which is the color of the designated patch group C, to the color list (S3). The designated patch group C includes multiple types of designated patches c. The designated patches c are the patches corresponding to the designated pixel e1 described later.

Figure 4:
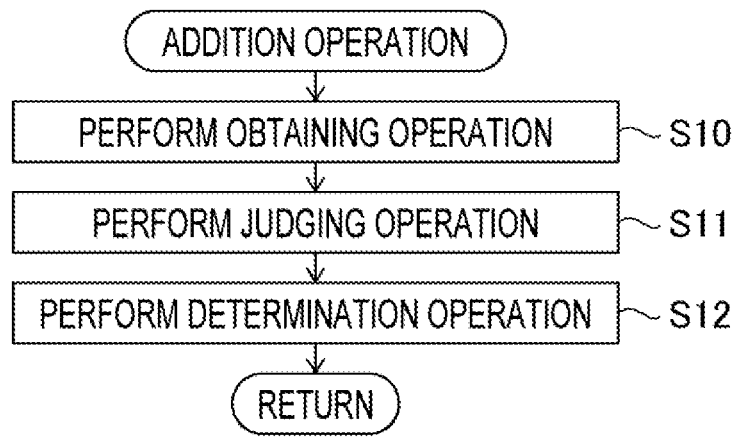
FIG. 4 shows a flowchart illustrating an additional operation.
Figure 5:
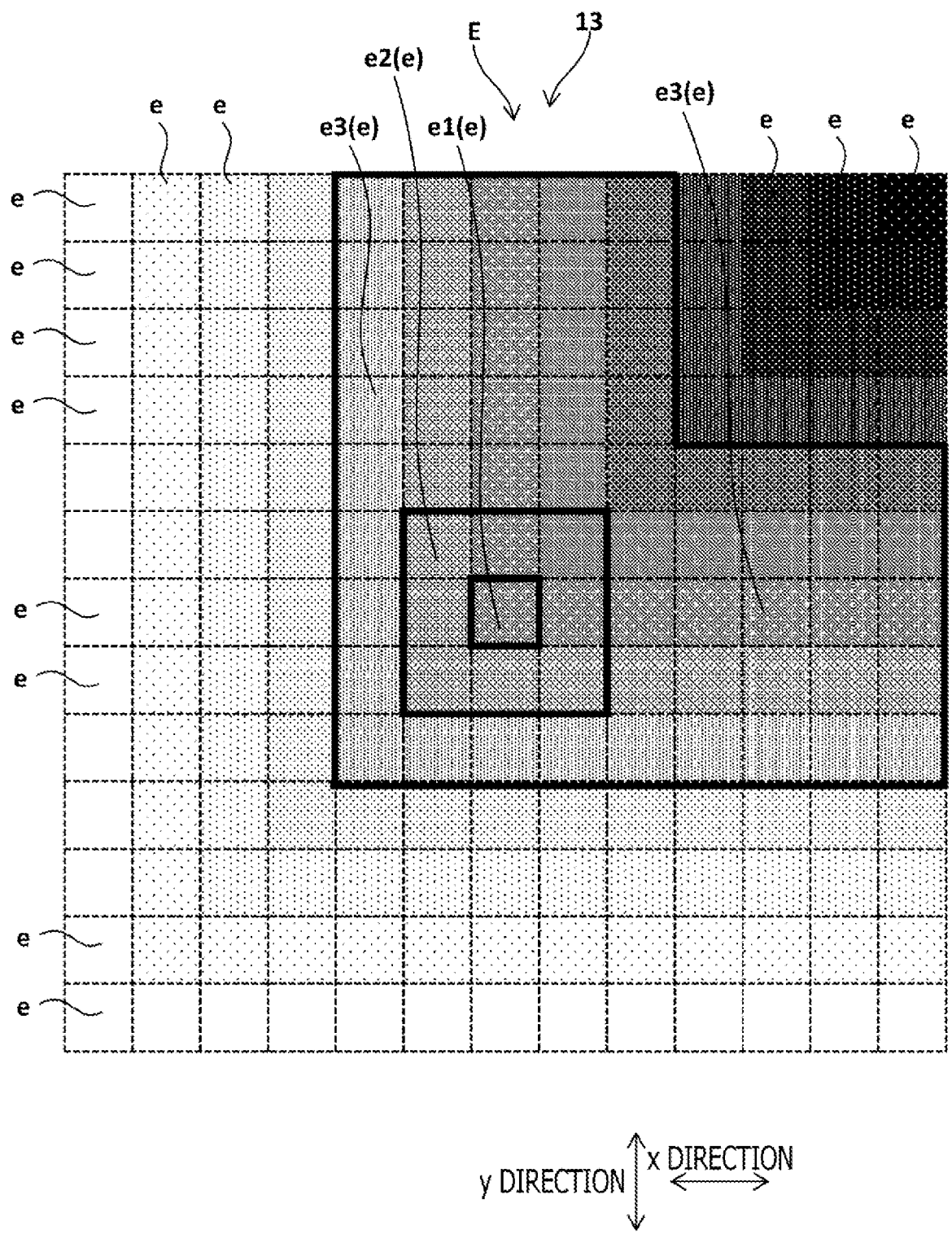
FIG. 5 shows a display on which an image is displayed.

The addition operation is performed in accordance with a flowchart shown in FIG. 4, which shows an example of the addition operation. The controller 50 performs an obtaining operation to obtain information regarding the designated pixel e1 designated by the input device 14 (S10). In other words, the controller 50 receives information designating the pixel e1 through the input device 14. For example, as shown in FIG. 5, the controller 50 obtains the image data of the image E and displays the image E on the display 13. The image E has a plurality of pixels e divided per unit area. The plurality of pixels e are aligned in the x-direction and in the y-direction, which intersects (e.g., orthogonally) the x-direction on the display 13, to form the image E.

The user designates one or more pixels e to be used for color calibration in the image E displayed on the display 13 using the input device 14. The controller 50 obtains the position on the display 13 designated through the input device 14. The controller 50 obtains, from the image data, the position in the x- and y-directions of the pixel e corresponding to this designated position as designated pixel e1, and the color value of the designated pixel e1, such as the RGB value thereof, as the designated color. The controller 50 adds the position and color value of the designated pixel e1 as the information regarding the designated pixel e1 to the designated pixel list in FIG. 6 and stores the designated pixel list in the storage 53. The position of pixel e may be represented by an x-order of pixels e aligned in the x-direction and a y-order of pixels e aligned in the y-direction from a given position in image E, or by x-coordinate and y-coordinate based on a given position in the image E or on display 13.

Since it is considered that the user designates pixel e in order of interest, starting with the pixel e that caught his/her eye, the earlier the order in which they are designated, the more important pixel e can be taken as the one that the user considers important. Therefore, the controller 50 is configured to determine that the earlier the pixel e is designated in the designated order, the higher the priority of the pixel for the user. For example, the controller 50 counts the order of designation, which is the order in which the pixel e was designated, and adds the order of designation, along with the position and color value of the designated pixel e1, to the designated pixel list in FIG. 6 as the information regarding designated pixel e1. Each time a pixel e is designated with use of the input device 14, the controller 50 adds the information regarding the pixel e corresponding to the designated position as designated pixel e1 to the designated pixel list in FIG. 6 in order, and stores the designated pixel list in the storage 53. Here, the No. 1 designated pixel e1 has the designation order of 1, the No. 2 designated pixel e1 has the designation order of 2, the No. 3 designated pixel e1 has the designation order of 3, and the No. 4 designated pixel e1 has the designation order of 4.

Then, the controller 50 extracts, based on the image data, the pixels e of the same color value as the color value of the designated color of the designated pixel e1 among all pixels e in the image E. The controller 50 obtains the number of the pixels e as the number of pixels of the designated color, and adds the number of pixels to the designated pixel list in FIG. 6 as the information regarding the designated pixel e1. The controller 50 then ranks them in order of the number of pixels. Thus, the more pixels e of the same color as the designated pixel e1 are contained in the image data, the higher the order of the number of pixels of the designated color. In the example in FIG. 6, the number of pixels of the No. 1 designated color is 160, and its order is No. 2. The number of pixels of the No. 2 designated color is 10, and its order is No. 4. The number of pixels of the No. 3 designated color is 300, and its order is No. 1. The number of pixels of the No. 4 designated color is 20, and its order is No. 3.

The controller 50 obtains the total number of surrounding pixels e2 and e3 surrounding the designated pixel e1 among all pixels e in the image E based on the image data, and adds the total number to the designated pixel list in FIG. 6 as information regarding the designated pixel e1. The larger the total number of the pixels e2 and e3 surrounding the designated pixel e1, the greater the impact on the impression that the user and others have on the image E. Therefore, if the part of the image E having the greatest impact can be made as the user intended, it can be made in accordance with the user's intent. Therefore, the controller 50 ranks them to No. 1, No. 2, No. 3 and No. 4 in order of the total number of the surrounding pixels e2 and e3. The total number of the surrounding pixels e2 and e3 is the number of pixels e that are located around the designated pixel e1 on the image E and of which the color difference from the designated color of the designated pixel e1 is less than the threshold value. Since the area of one pixel e is determined in advance, the area of the surrounding pixels e2 and e3 may be used as information regarding the designated pixel e1 instead of the total number of surrounding pixels e2 and e3.

As shown in FIG. 5, the pixels e located around the designated pixel e1 includes first surrounding pixels e2 adjacent to the designated pixel e1 in the image E and second surrounding pixels e3 which are connected to the designated pixel e1 via pixels e having color differences from the designated color less than the threshold value in the image E. In other words, there are no pixels e between the designated pixel e1 and the first surrounding pixels e2. Further, between the designated pixel e1 and the second surrounding pixels e3, there are no pixels having color differences from the designated color are equal to or greater than the threshold value. On the other hand, between the designated pixel e1 and the second surrounding pixels e3, there is at least one pixel e having a color difference from the designated color is less than the threshold value.

Figure 7:
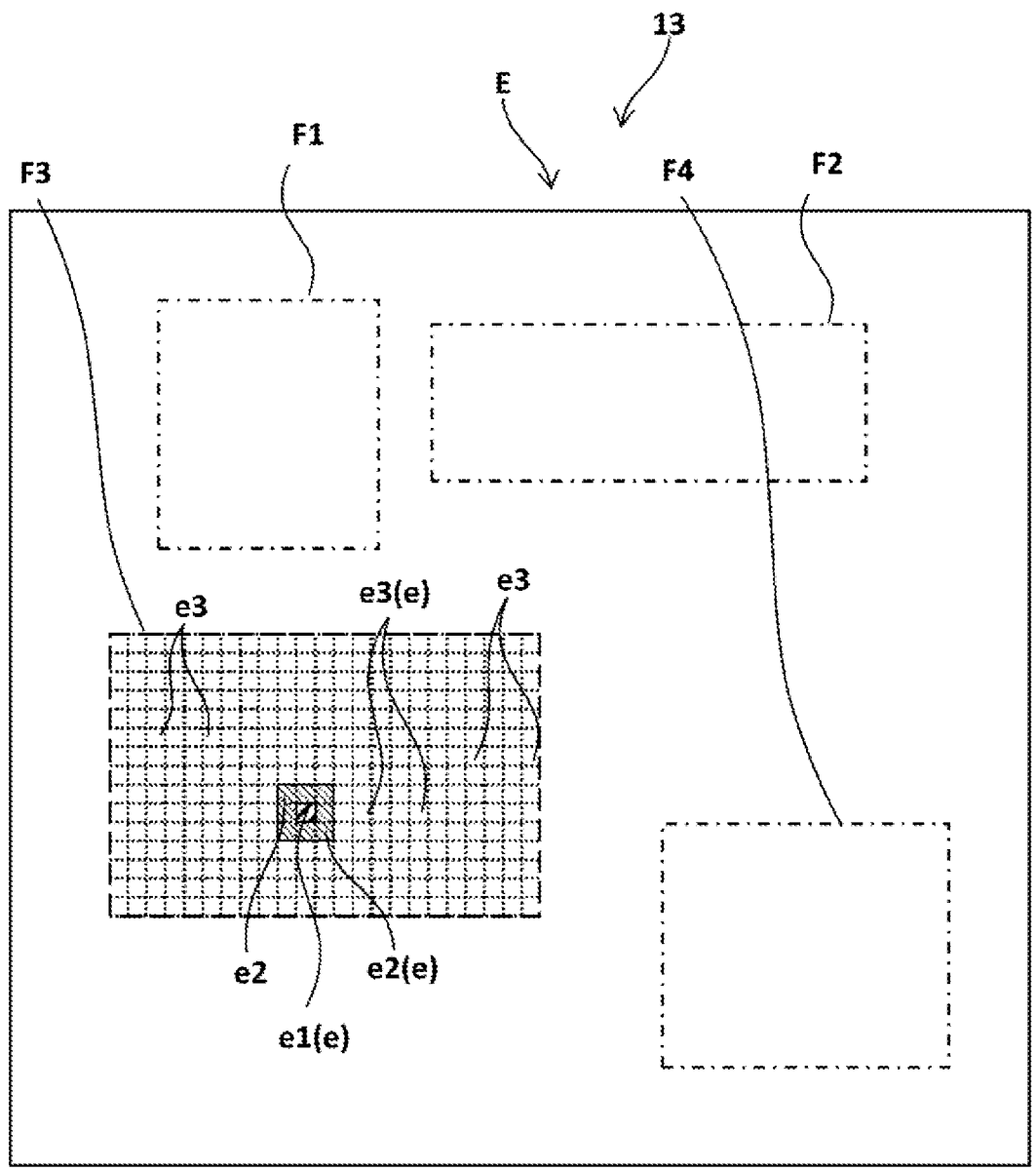
FIG. 7 shows the display on which an image is displayed.

The controller 50 is configured to obtain the color value of a pixel e in the image E and the position of the pixel e from the image data in an associated manner. The controller 50 obtains the color difference between the color value of the pixel e and the designated color of the designated pixel e1. As shown in FIG. 7, the controller 50 searches the image E for pixels e of which the color difference from the designated color is less than the threshold value, and extracts four areas of pixels e of that color from the image E, for example, four areas F1, F2, F3, and F4. Each area is a closed space and contains one or more pixels e. The color value of the pixel e approximates the designated color with a color difference from the color value of the designated color being less than the threshold value. In a region containing multiple pixels e, two pixels e are consecutively aligned in the x- or y-direction. The controller 50 then obtains the area F3 including the designated pixel e1 from the four areas F1, F2, F3, and F4. The area F3 has first surrounding pixels e2 and second surrounding pixels e3, which are pixels e located around the designated pixel e1 and of which the color difference from the designated color is less than the threshold value.

In this way, for the four types (i.e., No. 1 to No. 4) of designated pixels e1, the controller 50 obtains the number of first surrounding pixels e2 and the number of second surrounding pixels e3, and obtains the total number of these pixels. In the example shown in FIG. 6, the total number of No. 1 designated pixels e1 is 10, and its order in terms of the total number is No. 4. The total number of No. 2 designated pixels e1 is 28, and its order in terms of the total number is No. 2. The total number of No. 3 designated pixels e1 is 35, and its order in terms of the total number is No. 1. The total number of No. 4 designated pixels e1 is 24 and its order in terms of the total number is No. 3.

Next, the controller 50 performs a judging operation (S11). In the judging operation, the controller 50 judges the priority of the designated color of the designated pixel e1 based on information regarding the designated pixel e1 designated by the input device 14. For example, the controller 50 judges the priority based on at least one of the order of designation of the designated pixel e1, the order of the number of pixels of the designated color, and the total number of pixels of the surrounding pixels e1 and e3. The controller 50 adds the priority as the information regarding the designated pixel e1 to the designated pixel list and stores the same in the storage 53.

In the example shown in FIG. 6, the controller 50 calculates the sum of the order of designation of the designated pixel e1, the order of the number of pixels, and the order of the total number of surrounding pixels. The smaller the sum, the higher the total order, and the higher the total order, the higher priority is assigned. In other words, the No. 1 designated pixel e1 has the highest priority (i.e., the first highest priority). In this case, a sum of the No. 1designated pixel e1 is "7," which is sum of "1" which is the order of designation, "2" which is the order of the number of pixels, and "4" which is the order of the total number of the surrounding pixels. Since the total order based on this sum is second, the priority has the second highest order. The No. 2 designated pixel e1 has a sum of "8" and a total order based on the sum is third, and therefore has the third highest priority. The No. 3 designated pixel e1 has a sum of "5" and a total order based on the sum is first, and therefore, has the first highest priority. The No. 4 designated pixel e1 has a sum of "10" and a total order based on the sum is fourth, and therefore has a fourth highest priority.

Next, the controller 50 performs the determination operation (S12). In the determining operation, the controller 50 determines, according to the priority judged by the judging operation, one of the following conditions: the number; a size; and the number and the size of designated patches c in a patch chart D.

It is noted that the higher the priority of the designated pixel e1, the larger the number of designated patches c of the designated color. In this case, the size of one designated patch c may be, for example, of a particular size the same as a particular patch bn. The higher the priority of the designated color of the designated pixel e1, the larger the size of one designated patch c of that designated color. In this case, the number of multiple types of designated patches c may be the same as each other. The higher the priority of the designated color of the designated pixel e1, the larger the number of designated patches c of that color and the larger the size of each designated patch c. Thus, the higher the priority of the designated color is, the larger the total area of the designated patch c of that color may be.

In the example shown in FIG. 6, for the No. 1 to No. 4 designated patches c, the controller 50 determines the number of patches or the ratio of size according to the priority level. The No. 1 designated patch c of the first designated color is a first designated patch c1, No. 2 designated patch c of the second designated color is a second designated patch c2, No. 3 designated patch c of the third designated color is a third designated patch c3, and No. 4 designated patch c of the fourth designated color is a fourth designated patch c4.

The controller 50 determines the ratio such that the higher the priority, the greater the ratio of the number or size of the designated patches c. Since the priority corresponds to the sum of the orders, the ratio may be determined using the sum. In this case, the controller 50 calculates, for example, the ratio of the sum of the orders to the sum of the ranks of No. 1 through No. 4 designated patches c. The controller 50 then assigns ratios to priorities so that the higher the priority, the larger the ratio (percentage). Specifically, the total number of the sum of the ranks is the sum of "7" in No. 1, "8" in No. 2, and "5" in No. 3 and "10" in No. 4, which is "30." The sums of No. 1 through No. 4 orders are "7," "8," "5," and "10," respectively. Thus, the percentages are 8/30=27%, 5/30=17%, 7/30=23%, and 10/30=33%. In contrast, the controller 50 assigns a ratio to the designated patch c according to the priority rather than the sum of the orders. In other words, the controller 50 assigns a ratio to the designated patch c in such a manner that the higher the priority, the larger the ratio.

In other words, the controller 50 assigns a percentage to the designated patch c in such a manner that the higher the priority, the larger the percentage. The third designated patch c3, which has the first highest priority, is assigned the largest percentage (i.e., 33%). The first designated patch c1, which has the second highest priority, is assigned the second largest percentage (i.e., 27%). The second designated patch c2, which has the third highest priority, is assigned the third largest percentage (i.e., 23%). The fourth designated patch c4, which has the fourth highest priority, is assigned the fourth largest percentage (i.e., 17%).

When the ratio of 100% is represented by 10, the ratios of the numbers or sizes of the 3rd designated patch c3, the 1st designated patch c1, the 2nd designated patch c2, and the 4th designated patch c is 3:3:2:2. When the ratio of 100% is represented by 20, the ratios of the numbers or sizes of the 3rd designated patch c3, the 1st designated patch c1, the 2nd designated patch c2, and the 4th designated patch c is 7:5:5:3.

Figure 8:
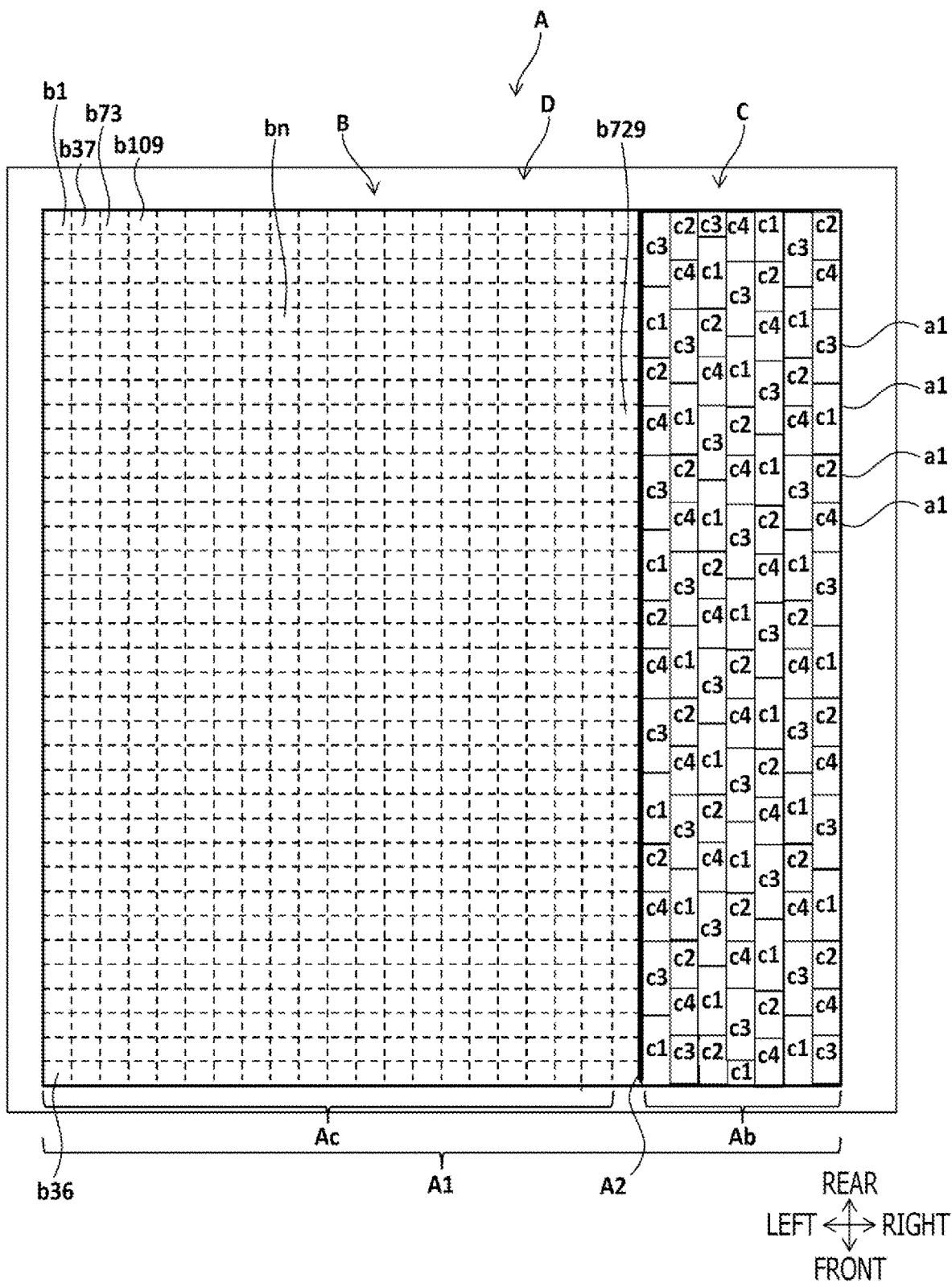
FIG. 8 shows a printing medium, viewed from the above, on which a patch chart is printed by a printing device according to the embodiment.

The controller 50 obtains, for example, at least one of the number and size of the designated patches c as a condition according to the ratio, and stores the designated pixel list including this condition in the storage 53. The controller 50 adds the designated color to the color list and stores the list in the storage 53, and returns to S4 of the flowchart shown in FIG. 3. In S4, the controller 50 performs a printing operation to print the patch chart D containing the designated patch c according to the condition on the printing medium A. Concretely, as shown in the example shown in FIG. 8, the patch chart D is an image representing patches of particular and designated colors in the color list, and includes the particular patch bn of the particular color and the designated patch c of the designated color.

While the particular and designated colors are defined by RGB values, the printing device 10 performs printing with four CMYK inks. In this case, the controller 50 reads the RGB values of the particular and designated colors from the storage 53 and converts the RGB values to CMYK values in the CMYK color space, which is the dependent color space of the printing device 10, based on particular correspondences between the RGB values and the CMYK values. The controller 50 then generates the image data of the patch chart D based on this CMYK value, the size of the designated patch bn obtained in S1, and the condition of the designated patch c determined in S12. The controller 50 prints the patch chart D based on this image data in the printing area A1 of the printing medium A. In this way, the particular patch bn and the designated patch c in the patch chart D corresponding to the color list are printed on the same printing medium A.

The printing medium A on which the patch chart D is printed includes a first area Ab in which a designated patch group C is printed and a second area Ac in which a particular patch group B is printed. For example, in the printing area A1, a boundary line A2 between the first area Ab and the second area Ac is provided. The boundary line A2 extends in the front-rear direction. It is noted that the boundary line A2 may be partially bent in the right-left direction. When the boundary line A2 is partially bent in the right-left direction, the bent portion extending in the right-left direction corresponds to a length, in the right-left direction, of a one-patch amount. It is also noted that the boundary line A2 may extend in the right-left direction.

The second area Ac is arranged on the left side with respect to the boundary line A2, and the first area Ab is arranged on the right side with respect to the boundary line A2. The second area Ac is a closed area including all the particular patches bn in the particular patch group B. Further, the first area Ab is a closed area including all the designated patches c in the designated patch group C. As above, the printing area A1 includes one boundary line A2, one second area Ac and one first area Ab.

The second area Ac includes multiple sections divided by the number of particular number of colors or more, and one particular patch bn is arranged in each section. The sizes of the multiple sections are the same particular size as each other. In the second area Ac, one particular patch bn is included for one kind of particular color, and multiple kinds of particular patches bn are arranged in the right-left direction and the front-rear direction.

The first area Ab includes multiple first sections a1 divided by the number of designated colors or more, and one designated patch c is arranged in each of the first sections a1. The first sections a1 are configured in such a manner that the higher the priority of the designated color of the patch c arranged therein, the larger the size of the section. In the example shown in FIG. 8, multiple designated patches c corresponding to the designated pixels e1 obtained in S10 are arranged on the right-left direction and in the front-rear direction in the first area Ab.

It is noted that the third designated patch c3, the first designated patch c1, the second designated patch c2 and the fourth designated patch c4 are arranged, for example, in a particular order (e.g., the order of the priority). Such the designated patches c are repeatedly arranged from up to down, and from left to right. Therefore, the designated patches having the same designated color are arranged in the patch chart D in a dispersed manner. Further, in the example shown in FIG. 8, the priority of the third designated color is higher than the priorities of the other designated colors, and the number of the third designated patches c3 of the third designated color is larger than the number of designated patches c of the other designated colors.

For example, the third designated patch c3, the first designated patch c1, the second designated patch c3 and the fourth designated patch c4 have size ratios of 3:3:2:2 according to the ratio determined in S12. The size of the smallest designated patch c4 is equal to or larger than a particular size, which is, for example, twice the particular size. Therefore, the designated patch c has a size equal to or larger than the particular size. Thus, in the patch chart D, the size of the designated patch c depends on the priority of the designated color determined in S11. It is noted that the higher the priority of the designated color, the larger the designated patch of the designated color.

Next, the controller 50 measures the patch chart D printed on the printing medium A with the colorimeter 15 to obtain the colorimetric values of the particular color of the particular patch bn and the designated color of the designated patch c of the patch chart D (S5). The colorimetric values are expressed in device-independent color coordinates such as Lab values. The Lab values are color values, which are coordinate values in the L*a*b* color space, where L represent brightness, and a and b are Cartesian coordinates for hue and saturation. The controller 50 stores the RGB values of the particular colors and the designated color of a designated patch cm, and the Lab values which are colorimetric values thereof in the color list in an associated manner.

It is noted that the colorimetric values are obtained for each patch. Since multiple designated patches c are arranged for one designated color in the patch chart D, multiple colorimetric values are obtained for one designated color. Optionally, for a designated patch c larger than the particular size, colorimetric values at multiple positions of the designated patch may be obtained. In such a case, the larger the size of the designated patch c, the more the colorimetric values may be obtained. In this way, the higher the priority of the designated color is, the more the colorimetric values of the designated patch c for one designated color may be obtained. Thus, when multiple colorimetric values are obtained, the controller 50 calculates the average value of the multiple colorimetric values for each designated color, associates the Lab value of this average value with the RGB value of the designated color, and stores the same in the color list.

There could be a case where the designated color and the particular color are the same. In this case, colorimetric values are obtained for the designated patch c and the particular patch bn of the same color value. Therefore, the controller 50 calculates the average of multiple colorimetric values for respective color values, associates the Lab value, which is the thus calculated average value, with the RGB values of the color values of the designated color and the particular color, and stores the same in the color list.

Next, the controller 50 interpolates the particular color in the color gamut of the printing device 10 (S6). For example, the particular color in the color list is the RGB value with 32 increments. For this interpolation of the particular color, the controller 50 obtains the RGB values for the color gamut of the printing device 10 in increments smaller than the 32 increment values, which are the increment values of the particular color, for example, with 16 increments. These 16 increments of the RGB values are (256/16+1)×4913 different colors, with the RGB values for 729 particular colors with 32 increments, and the RGB values for interpolated colors, which are the 4184 different colors between the RGB values.

In the color list, the RGB values and the Lab values for the particular color are associated with each other, and the RGB values and the Lab values for the designated color are associated with each other. If the RGB values of the designated color do not match the RGB values of the 16 increments, the controller 50 modifies the RGB value closest to the RGB value of the designated color among the RGB values of the 16 increments as the RGB value of the designated color. In this way, the RGB values in the color list are 16 increments of color values.

The controller 50 then obtains the Lab values based on the correspondence between the RGB values and the Lab values of the particular color and the designated colors, and adds the same to the color list as the Lab values corresponding to the RGB values of the remaining interpolated colors. As a result, the color list contains the correspondence between the RGB values and Lab values of the particular color, the correspondence between the RGB values and Lab values of the designated color, and the correspondence between the RGB values and Lab values obtained based on the particular color and the designated color. In this way, in the color list, the color between two particular colors is interpolated by color based on the designated color and color based on the particular color and the designated color.

Next, the controller 50 performs a generating operation (S7). In the generating operation, the controller 50 generates a color calibration profile to convert the color of the image data into the color of the image E to be printed by the printing operation so that the color of image E becomes the target color, based on the color list. It is noted that the target color is the color input to the controller 50 from the input device 14 through the interface 51, and is the color output by the output device, such as a display, other printers or the like.

Concretely, the controller 50 obtains the correspondence between the RGB values and the Lab values for the target color. Then, the controller 50 generates a conversion table of RGB values to convert from the RGB values of the color list to the RGB values of the target color so that the Lab values of the target color and the Lab values of the color list match each other. Furthermore, when the ink colors used by the printing device 10 for printing are cyan, magenta, yellow, and black, the controller 50 generates the color calibration profile which is a conversion table to convert the RGB values of the target color in the RGB value conversion table to the CMYK values based on the particular correspondences, and stores the same in the storage 53. In this color calibration profile, the RGB values of the image data, which correspond to the RGB values in the color list, are associated with the CMYK values of the target color so that the color of image E printed by the printing operation is the target color.

When the printing device 10 prints the image E based on the image data, the controller 50 converts the RGB values of the image data to the CMYK values of the target color based on the color calibration profile. Then, the controller 50 prints the image E on the printing medium A based on the converted CMYK values of the image data. In this way, the color of the image E printed by the printing device 10 can be matched to the target color. For example, it is possible to match the shade of image E output by another output device based on image data with the shade of image E printed by the printing device 10 based on this same image data that has been color calibrated based on the color calibration profile.

In the printing device 10, the controller 50 performs the judging operation, the determining operation and the printing operation. The judging operation is an operation to judge the priority of the designated color of the designated pixel e1 based on the information regarding the designated pixel e1 designated by the input device 14. The determining operation is an operation to determine one condition from among the number, the size, both the number and the size of designated patches c of the designated color, based on the priority judged by the judging operation. The printing operation is an operation to print the patch chart D containing the designated patch c that matches the condition on the printing medium A.

The designated patch c printed as above represents the designated color of the designated pixel e1 that is designated by the user. For example, the designated patch c is measured and the color is calibrated based on the colorimetric values. In such a case, since the designated pixel e1 designated by the user is used for the color calibration, the color calibration in accordance with the user's intent can be performed appropriately.

At least one of the number and size of the designated patches c is adjusted according to the priority based on the information regarding the designated pixel e1 designated by the user. For example, the higher the priority, the larger the number of the designated patches c or the larger the size of the designated patches c. In this way, since the number of the colorimetric values of the designated patch c is increased and an average of these colorimetric values is used as the colorimetric value, the accuracy of the colorimetric value is increased, thereby improving the color calibration of the image according to the user's intent.

In the printing device 10, the information regarding the designated pixel e1 is information regarding the order of designation of the designated pixel e1 by the input device 14. In the judging operation, the controller 50 judges the priority higher for the designated color of the designated pixel e1 that is designated earlier in the order of designation. Thus, the earlier the order of designation of designated pixel e1, the more important the designated color of the designated pixel e1 is, and the higher the priority of the designated color. In this case, for example, the higher the priority of the designated color, the larger the number of designated patches c for each of those designated colors may be, or the larger the size of the designated patches c may be. In this way, the number of colorimetric values of the designated patch c is increased and the accuracy of the colorimetric values is enhanced, thereby improving the color calibration of the image according to the user's intent.

In the printing device 10, the information regarding the designated pixel e1 is information regarding the number of pixels e of the same color as the designated pixel e1 among the plurality of pixels e that the image data has. In the judging operation, the controller judges that the priority of the designated color of the designated pixels e1 is higher as the number of the pixels e having the same color as the designated pixel e1 is larger in the range of the image data. Thus, the more pixels e of the same color as the designated pixel e1 are in the image E, the more important the designated color of the designated pixel e1 is, and thus the priority of the designated color is raised. In this case, for example, the higher the priority of the designated color, the larger the number of the designated patches c for each of the designated colors, or the larger the size of the designated patches c. In this way, the number of the colorimetric values of the designated patches c is increased and the accuracy of the colorimetric values is enhanced, thereby improving the color calibration of the image according to the user's intent.

In the printing device 10, the information regarding the designated pixel e1 is the information regarding the total number of the surrounding pixels e2 and e3, where the surrounding pixels e2 and e3 are the pixels e each having a color difference with respect to the designated color of the designated pixel e1 designated by the input device 14 is equal to or less than the particular value, the surrounding pixels e2 being adjacent to the designated pixel d1, and the surrounding pixels e3 being connected to the designated pixel e1 via the pixel e. In the judging operation, the controller 50 judges that the designated color of the designated pixel e1 with a larger total number of surrounding pixels e2 and e3 to have a higher priority than the designated pixel with a smaller number of surrounding pixels e2 and e3. Thus, the more the surrounding pixels e2 and e3 having an approximate color approximate to the designated color around the designated pixel e1 are in the image E, the more important the designated color of that designated pixel e1 is, and thus the higher the priority of the designated color. In this case, for example, the higher the priority of the designated color, the larger the number of designated patches c for each of the designated colors may be, or the larger the size of the designated patches c may be. In this way, the number of colorimetric values of the designated patch c is increased and the accuracy of the colorimetric values is enhanced, thereby improving the color calibration of the image according to the user's intent.

In the printing device 10, the patch chart D includes a plurality of designated patches c with the same designated color, and the plurality of designated patches c with the same designated color are arranged in such a manner that they are not adjacent to each other. As described above, multiple designated patches c with the same designated color are arranged in the patch chart D in a dispersed manner, thus reducing errors in the colorimetric values of the designated patches c caused by their positions in the patch chart D.

In the printing device 10, the patch chart D has first multiple sections a1 in which the first area Ab is divided by a number greater than or equal to the number of colors of the designated color. One designated patch c is arranged in each of the first sections a1, and the higher the priority of the designated color of the arranged designated patch c, the larger the size of the first section a1. The larger the size of the designated patch c, the more colorimetric values can be taken for the designated patch c. By using the average of the colorimetric values as the colorimetric value, the accuracy of the colorimetric value is increased, thereby improving the color calibration of the image.

The printing device 10 described above may be modified in such a manner that the information regarding the designated pixel e1 is information regarding a variation value for the colorimetric values of the designated patch c of the designated color of the designated pixel e1. The controller 50 judges, in the judging operation, that the larger the variation value of the designated colors of the designated pixels e1, the higher the priority.

Concretely, in the obtaining operation of S10 in FIG. 4, the controller 50 obtains the variation value of the colorimetric values as the information regarding the designated pixel e1, from the storage 53, the input device 14 or the interface 51. The variation value of the colorimetric value is a value indicating the magnitude of variation of the colorimetric values and is, for example, the standard deviation of the colorimetric values per one color value. The correspondence between the RGB value of the designated color and the variation value of the colorimetric values of the designated patch c of the designated color is defined in advance as a table or formula. In this correspondence, the smaller the mixing ratio of the CYMK color in the designated color, the smaller the variation value. That is, the variation value of colorimetric values is smaller when the designated color is a single color rather than when the designated color is a mixed color. When the designated color is a mixed color, the closer the mixing ratio of the CYMKs to each other evenly, the larger the variation value of the colorimetric values.

Next, in the judging operation of step S11 in FIG. 4, the controller 50 judges that the higher the variation value of the colorimetric values, the higher the order of the variation. When the priority of the designated color is judged based solely on the order of the variation value, the controller 50 judges the priority in such a manner that the higher the order of the variation value of the colorimetric value of the designated patch c, the higher the priority of the designated color of that patch c.

In addition to the order of the variation values, the priority may be judged based on at least one of the order of the designation order of the designated pixel e1, the order of the number of pixels, and the order of the total number of pixels. In the case, the controller 50 calculates the sum of the order of the variation value, and at least one of the designation order, the number of pixels and the total number, and judges the priority in such a manner that the higher the order of the sum based on the sum, the higher the priority.

Thus, based on the variation value of the colorimetric values of the designated patch c, the priority of the designated color for that designated patch c is judged. The larger this variation value, the higher the priority of the designated color, e.g., the larger the number of designated patches c for each of its designated colors, or the larger the size of the designated patches c. By increasing the priority of the designated color as the variation value is larger, the number of designated patches c for each of the designated colors, or the size of the designated patches c may be increased. In this way, the number of colorimetric values of the designated patch c is increased and the accuracy of the colorimetric values is enhanced, thereby improving the color calibration of the image.

The printing device 10 described above and/or modified as above may further be modified in such a manner that the patch chart D includes second multiple sections a2, where the first area Ab is divided into the same number of sections as the designated color in the front-rear direction. In each of the second sections a2, one designated patch c is arranged. The higher the priority of the designated color of the arranged designated patch c, the larger the size of the second section a2.

Figure 9:
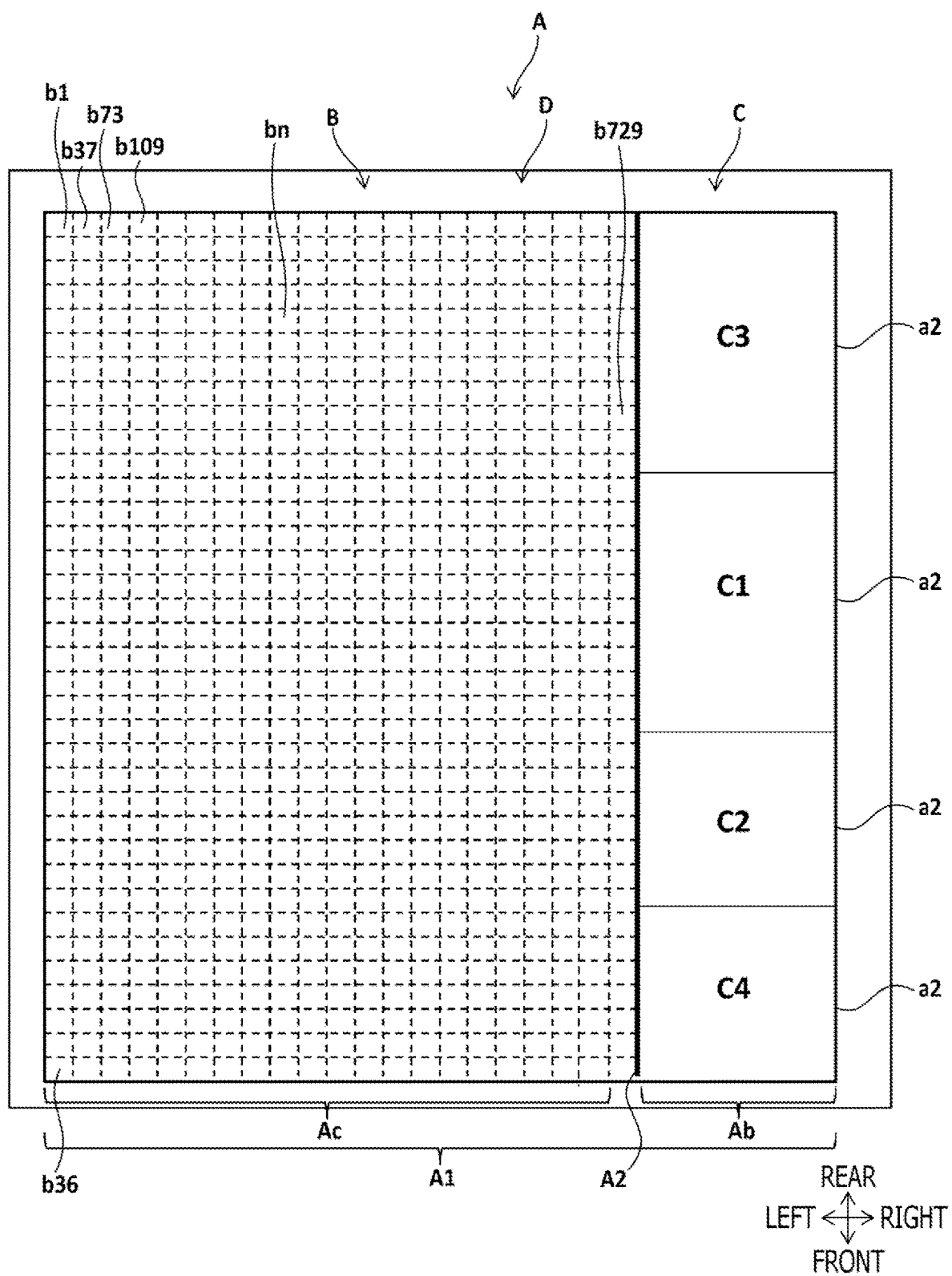
FIG. 9 shows a printing medium, viewed from the above, on which a patch chart is printed by a printing device according to a second modification.

In the example shown in FIG. 9, for the four designated colors obtained in S10 of FIG. 4, the first area Ab is divided into four rectangular second sections a2. The number of the second sections a2 is the same as the number of the designated colors. These second sections a2 are aligned in the front-rear direction, and the third designated patch c3, the first designated patch c1, the second designated patch c2, and the fourth designated patch c4 are arranged in the second section a2 in this order from the second section a2 arranged on the rear side. The priority judged in S11 of FIG. 4 decreases, in the order, for the third designated color, for the first designated color, for the second designated color and for the fourth designated color. Accordingly, the size of the third designated patch c3 of the third color, the first designated patch c1 of the first color, the second designated patch c2 of the second color, and the fourth designated patch c4 of the fourth color are reduced in this order according to the size ratio determined in S12 in FIG. 4. The fourth designated patch c4, which is the smallest patch, is larger than the particular patch bn.

As described above, the larger the size of the designated patch c, the more colorimetric values can be taken for the designated patch c. By using the average of these colorimetric values as the colorimetric value, the accuracy of the colorimetric value is increased, thereby improving the color calibration of the image.

The printing device 10 described above may further be modified in such a manner that the patch chart D has third multiple sections a3 which are formed by dividing the first area Ab in the front-rear direction and fourth multiple sections a4 which are formed by dividing the third section a3 into the same number of sections as the designated color in the direction that intersects the front-rear direction. In each of the fourth sections a4, one designated patch c is arranged. The higher the priority of the designated color of the placed designated patch c, the larger the size of the fourth compartment a4.

It is noted that, in the patch chart D, an arrangement pattern of the fourth multiple sections a4 within the third section a3 may differ from each other between adjacent third sections a3.

Figure 10:
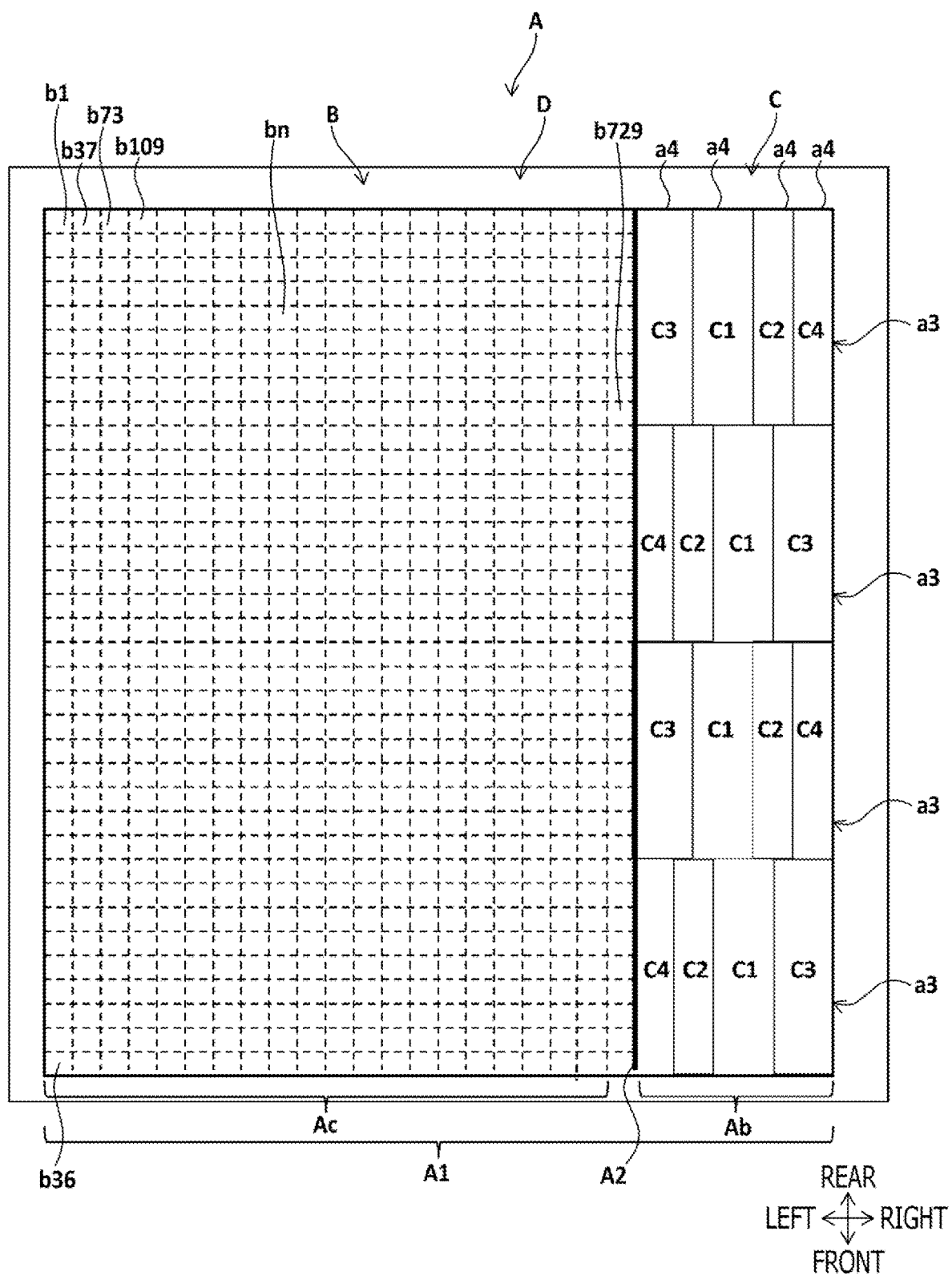
FIG. 10 shows a printing medium, viewed from the above, on which a patch chart is printed by a printing device according to a third modification.

In the example shown in FIG. 10, the first area Ab is divided into four rectangular third sections a3 in the front-rear direction. The four third sections a3 are arranged in the front-rear direction. For the four designated colors obtained in S10 of FIG. 4, each of the third sections a3 is divided into four rectangular fourth sections a4, the number of which are the same as the number of the designated colors. The four sections a4 are arranged in the right-left direction. In each of the odd-numbered third sections a3 from the rear side, the third designated patch c3, the first designated patch c1, the second designated patch c2, and the fourth designated patch c4 are arranged in the fourth sections a4 in this order from the left to right. In each of the even-numbered third section a3 from the rear end, the third designated patch c3, the first designated patch c1, the second designated patch c2, and the fourth designated patch c4 are arranged in the fourth sections a4 in this order from the right to left.

The third designated patch c3 in the even-numbered third section a3 from the rear is located at a position between the two odd-numbered third sections a3 from the rear side in the front-rear direction, and between the fourth designated patches c4 of the two odd-numbered third sections a3 from the rear side in the front-rear direction. Further, the third designated patch c3 in the even-numbered third section a3 from the rear side is located at a position between the odd-numbered third sections a3 from the rear in the front-rear direction, and between the second designated patches c2 of the odd-numbered third sections a3 from the rear side in the front-rear direction. As shown above, the order of arrangement of the designated patches c in the right-left direction differs between the odd-numbered third sections a3 and the even-numbered third sections a3 that are adjacent to each other.

The priority of the third, first, second, and fourth designated colors judged in S11 of FIG. 4 becomes lower in this order. Accordingly, the sizes of the third designated patch c3 of the third color, the first designated patch c1 of the first color, the second designated patch c2 of the second color, and the fourth designated patch c4 of the fourth color become smaller in this order according to the size ratio determined in S12 in FIG. 4. The fourth designated patch c4, which is the smallest, is larger than the particular patch bn.

As shown above, the first area Ab is divided into sections in the front-rear direction and the right-left direction, in such a manner that the designated patches c of the same color arranged in the sections are distributed in the front-rear direction and the right-left direction. In this way, errors in the colorimetric values due to position can be reduced and the color calibration of the image can be improved.

The printing device 10 can be further modified in such a manner that the patch chart D includes fifth multiple sections a5 which are formed by dividing the first area Ab into the same number of sections as the number of designated colors in the right-left direction. In each of the fifth multiple sections a5, one designated patch c is arranged. The size of the fifth compartment A5 is larger as the priority of the designated color of the arranged designated patch C is higher.

Figure 11:
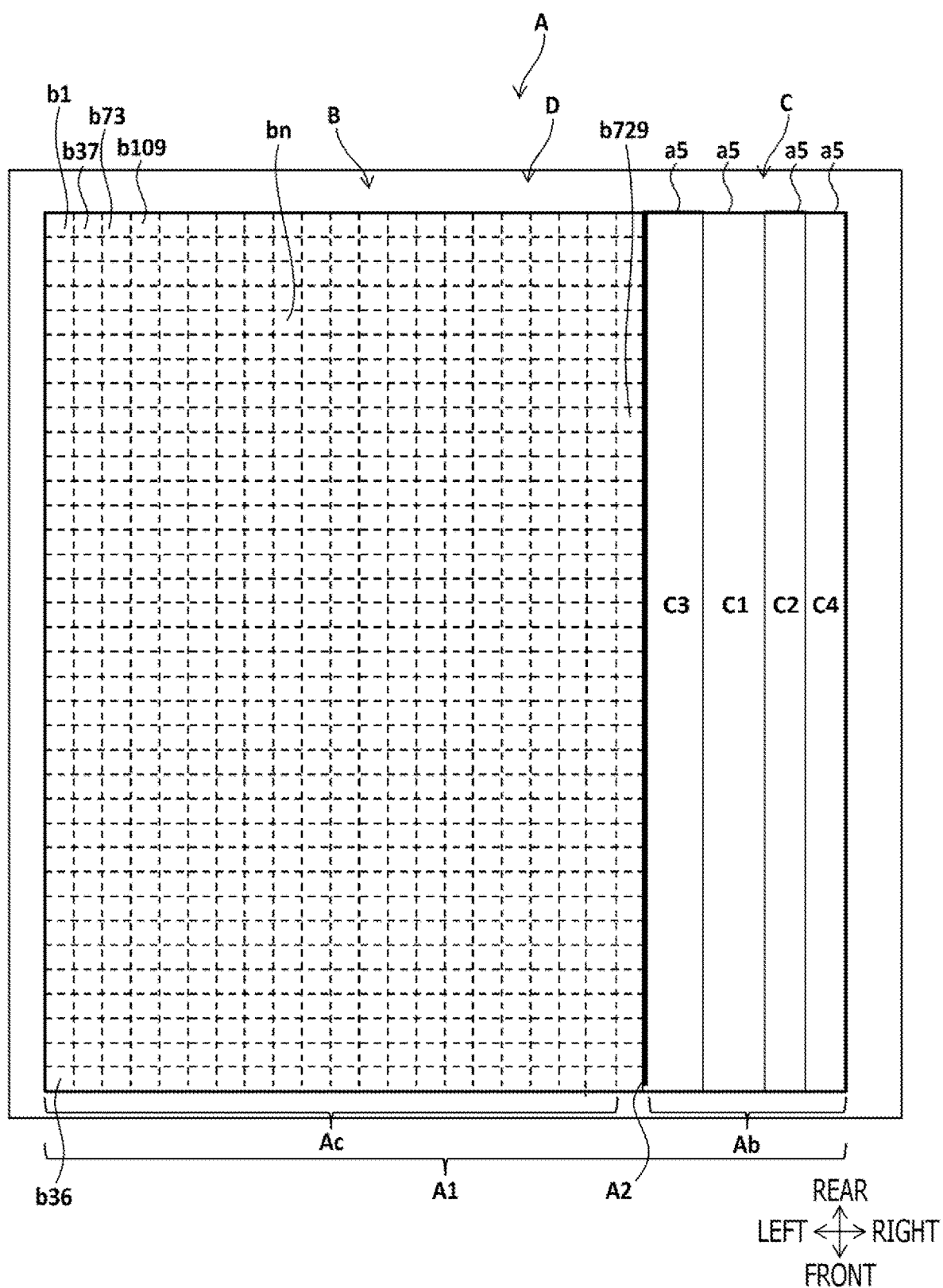
FIG. 11 shows a printing medium, viewed from the above, on which a patch chart is printed by a printing device according to a fourth modification.

In the example shown in FIG. 11, the first area Ab is divided in the right-left direction into four rectangular fifth sections a5, the number of which is the same as the number of designated colors, for the four designated colors obtained in S10 in FIG. 4. These fifth sections a5 are aligned in the right-left direction, and the third designated patch c3, the first designated patch c1, the second designated patch c2, and the fourth designated patch c4 are arranged in the fifth section a5 in this order from the leftmost fifth section a5. The priority of the third designated color, first designated color, second designated color and fourth designated color judged in S11 of FIG. 4 decreases in this order. Accordingly, the size of the third designated patch c3 of the third color, the first designated patch c1 of the first color, the second designated patch c2 of the second color, and the fourth designated patch c4 of the fourth color become smaller in this order according to the size ratio determined in S12 in FIG. 4. The fourth designated patch c4, which is the smallest, is larger than the particular patch bn.

In this way, the larger the size of the designated patch c, the more colorimetric values can be taken from the designated patch c. By using the average of the colorimetric values as the colorimetric value, the accuracy of the colorimetric value is increased, thus improving the color calibration of the image.

In the above example in FIG. 7, in the search operation for pixels e2 and e3 surrounding the designated pixel e1, the controller 50 extracts, from pixels e of image E, an area of a pixel e of which color difference from the designated color is less than a threshold value, and including the designated pixel e1, and obtains the number of pixels within the area as the total number of surrounding pixels e2 and e3 of the designated pixel e1. In contrast, as shown in the example shown in FIGS. 12A-12C, for each pixel e in the direction away from the designated pixel e1, the controller 50 may obtain the pixels e for which the color difference from the designated color is less than the threshold value, and the number of such pixels e as the total number of pixels e2 and e3 surrounding the designated pixel e1.

Figure 12A:
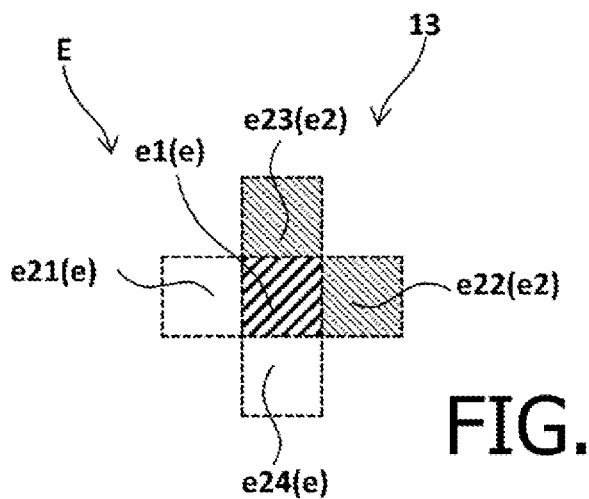
FIGS. 12A-12C illustrate operations to obtain a total number of peripheral pixels with a printing device according to a fifth embodiment.

Concretely, the controller 50 obtains, from the image data, the designated color of the designated pixel e1 designated by the input device 14 in the image E displayed on the display 13, as shown in FIG. 12A. The controller 50 obtains the color from the image data for each of the four pixels e (e21 to e24) adjacent to the designated pixel e1 in the x and y directions. The controller 50 obtains the pixel e of the color of which the color difference from the designated color is less than the threshold value as the first surrounding pixel e2 among the four pixels e. For example, among the four pixels e21 to e24, the color difference between the designated color and a color of each of the first surrounding pixels e22 and e23 is less than the threshold value.

Figure 12B:
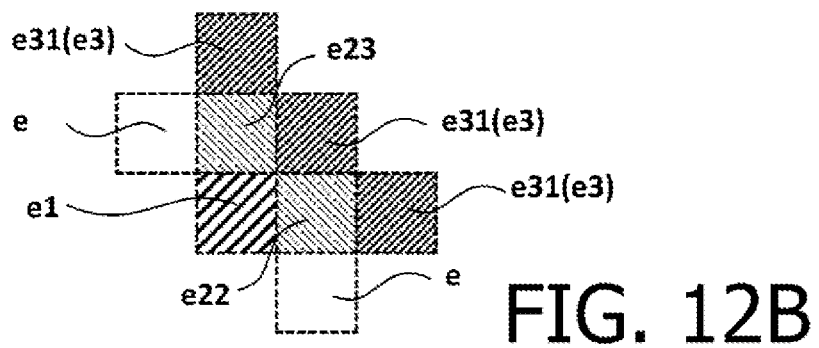

Then, as shown in FIG. 12B, the controller 50 obtains, from the image data, the colors of the four pixels e adjacent to the first surrounding pixel e22 and the four pixels e adjacent to the first surrounding pixel e23. The controller 50 obtains the pixel e of which the color difference from the designated color is less than the threshold value among these adjacent pixels e. For example, three of the adjacent pixels e31 are obtained as the second surrounding pixels e3.

Figure 12C:
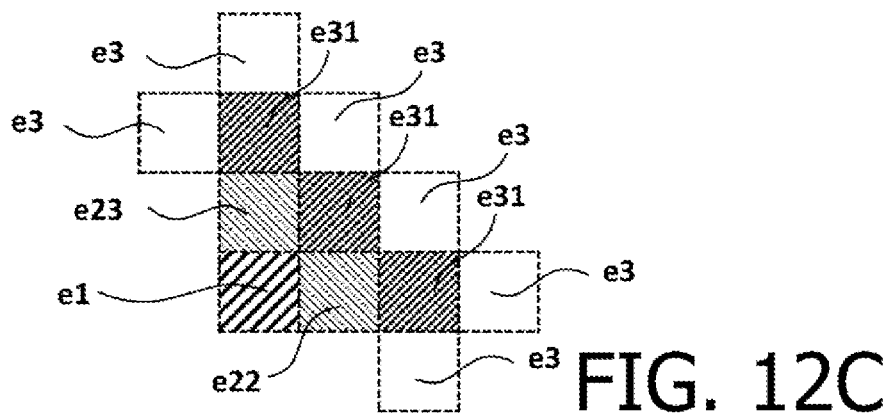

Then, as shown in FIG. 12C, the controller 50 obtains colors of four pixels e adjacent to each of the three second surrounding pixels e3. The controller 50 obtains, among the adjacent pixels e, one of which color difference from the designated color is less than the threshold as the second surrounding pixel e3.

As described above, the controller 50 is configured to repeatedly search, in the image E, the pixels e respectively adjacent to the designated pixel e1, the first surrounding pixel e2 and the second surrounding pixel e3, sequentially, for a pixel e of which color difference from the designated color is less than the threshold value, and obtain the pixel as the surrounding pixel e2 or e3. According to this process, by expanding the range of one closed approximate color centered on the designated pixel e1, the colors of pixels e with small color differences, such as gradations, can be added to the color list, thus improving the color calibration of the image E with small color differences between pixels e.

The printing device 10 can further be modified in various ways.

In the above-described embodiment, the controller 50 is configured to calculate the sum of the order of designation of the designated pixel e1, the order of the number of pixels, and the order of the total number of pixels, and assign a higher priority the higher the total order based on the sum. Such a configuration may be modified. In the modified configuration described above for determining the order of the variation value of the colorimetric values of the designated patch c, the controller 50 may calculate the sum of the order of designation of the designated pixel e1, the order of the number of pixels, the order of the total number of pixels, and the order of the variation value of the colorimetric values of the designated patch c, and assign a higher priority the higher the total order based on the sum.

Optionally, the controller 50 may calculate the sum by combining only any three of the following: the order of designation of the designated pixels e1, the order of the number of pixels, the order of the total number of pixels, and the order of the variation value of the colorimetric values of the designated patch c.

Concretely, the controller 50 may calculate the sum of three orders: the order of designation of the designated pixel e1, the order of the number of pixels, and the order of the variation value of the colorimetric value of the designated patch c. Then, the higher the total order based on the sum, the higher the priority may be assigned to the designated pixel. Alternatively, the controller 50 may calculate the sum of three orders: the order of designation of the designated pixels e1, the order of the total number, and the order of the variation value of the colorimetric value of the designated patch c. The higher the total order based on the sum, the higher the priority may be assigned. Further alternatively, the controller 50 may calculate the total of the order of the number of pixels, the order of the total number of pixels, and the order of the variation value of the colorimetric value of the designated patch c. Then, the higher the total order based on the sum, the higher the priority may be assigned to the patch.

In the above-described embodiment, the controller 50 is configured to calculate the sum of the order of designation of the designated pixel e1, the order of the number of pixels, and the order of the total number of the surrounding pixels, and assigned a higher priority the higher the total order based on the sum. Such a configuration may be modified. The controller 50 may assume that the only information regarding the designated pixel e1 is the order of designation of the designated pixel e1, and the higher the order of designation of the designated pixel e1, the higher the priority may be assigned to the designated pixel e1. The controller 50 may assume that the information regarding the designated pixel e1 is only the order of the number of pixels, and the higher the order of the number of pixels, the higher the priority may be assigned to the designated pixel e1. Alternatively, the controller 50 may assume that the information regarding the designated pixel e1 is only the order of the total number of surrounding pixels, and the higher the order of the total number of pixels, the higher the priority may be assigned to the designated pixel e1.

In the above-described embodiment, the controller 50 is configured to calculate the sum of the order of designation of the designated pixel e1, the order of the number of pixels, and the order of the total number of the surrounding pixels, and assigned a higher priority the higher the total order based on the sum. Such a configuration may be modified. The controller 50 may combine only any two of the order of designation of the designated pixels e1, the order of the number of pixels, and the order of the total number of pixels.

Concretely, the controller 50 may assume that the information regarding the designated pixel e1 is only the order of designation of the designated pixel e1 and the order of the number of pixels, and calculate the sum of the order of designation of the designated pixel e1 and the order of the number of pixels, and assign a higher priority to the designated pixel e1 the higher the total order based on the sum. The sum of the order of designation of the designated pixels e1 and the order of the number of pixels may be calculated, and the higher the total order based on the sum, the higher the priority may be assigned. Alternatively, the controller 50 may assume that the information regarding the designated pixel e1 is only the order of designation of the designated pixel e1 and the order of the total number of pixels, and the higher the total order based on the sum, the higher the priority of the designated pixel e1. Further alternatively, the controller 50 assume that the information regarding designated pixel e1 is only the order of the number of pixels and the order of the total number of pixels, calculate the sum of the order of the number of pixels and the order of the total number of pixels, and the higher the total order based on the sum, the higher the priority may be assigned.

All of the above-described configurations and modifications may be combined with each other as long as they do not exclude each other's counterparts. From the above description, many improvements and other configurations may be obvious to those skilled in the art. Accordingly, the above-described configurations and modifications should be interpreted only as examples and are provided for the purpose of teaching those skilled in the art how best to implement the configurations according to aspects of the present disclosures. The details of the above-described structures and/or functions may be substantially changed without departing from the aspects of the present disclosures.

What is claimed is:

1. A printing device, comprising:
   a head including nozzles configured to eject ink and is configured to print, with use of the ink, an image having a plurality of pixels on a printing medium;
   an input device configured to receive information designating a pixel in the image; and
   a controller configured to perform:
      judging a priority of a designated color of a designated pixel designated by the information designating the pixel;
      determining one of conditions including (a) a number of designated patches of the designated color, (b) sizes of the designated patches of the designated color, and (c) the number and sizes of the designated patches of the designated color, based on the priority judged by the judging; and
      printing a patch chart containing the designated patch according to the one of the conditions determined in the determining on the printing medium.

2. The printing device according to claim 1,
   wherein the information designating the pixel is information regarding an order of designation of designated pixels designated by the input device, and
   wherein the controller is configured to judge, in the judging, the priority higher for the designated color of the designated pixel that is designated earlier in the order of designation.

3. The printing device according to claim 1,
   wherein the information designating the pixel is information regarding a number of pixels having a same color as a color of the designate pixel among the plurality of pixels in the image data, and
   wherein the controller is configured to judge, in the judging, the priority higher for the designated color of the designated pixel having a larger number of the pixels having a same color as a color of the designate pixel in the image data.

4. The printing device according to claim 1,
   wherein the information designating the designated pixel is information regarding a number of a total number of surrounding pixels, the surround pixels including first surrounding pixels adjacent to the designated pixel and second surrounding pixels connected to the designated pixel via the surrounding pixels adjacent to the designated pixel, the first surrounding pixels adjacent to the designated pixel being pixels each having a color difference with respect to the designated color of the designated pixel designated by the input device is equal to or less than a particular value and the second surrounding pixels adjacent to the surrounding pixel being pixels each having a color difference with respect to the designated color of the designated pixel designated by the input device is equal to or less than a particular value, and
   wherein the controller is configured to judge, in the judging, the priority higher for the designated color of the designated pixel with a larger total number of the surrounding pixels.

5. The printing device according to claim 1,
   wherein the information designating the designated pixel is information regarding a variation value for colorimetric values of the designated patch of the designated color of the designated pixel, and
   wherein the controller is configured to judge, in the judging, the priority higher for the designated color of the designated pixel having a larger variation value.

6. The printing device according to claim 1,
   wherein the patch chart includes a plurality of the designated patches with a same designated color, the plurality of designated patches are arranged in such a manner that the plurality of designated patches are not adjacent to each other.

7. The printing device according to claim 1, further comprising a storage that store a particular color for the patch,
   wherein the patch chart has a first area including the designated patch and a second area including a particular patch, the particular patch being a patch of the particular color.

8. The printing device according to claim 7,
   wherein the patch chart includes first multiple sections formed by dividing the first area by a number of designated colors or more, and one of the designated patch is arranged in each of the first sections, the first multiple sections being configured in such a manner that the higher the priority of the designated color of the arranged designated patch, the larger the size of each of the first multiple sections.

9. The printing device according to claim 7, further comprising a conveyor configured to convey the printing medium in first direction,
   wherein the patch chart includes second multiple sections formed by dividing the first area into a number of designated colors in the first direction, one of the designated patch being arranged in each of the second sections, the second multiple sections being configured in such a manner that the higher the priority of the designated color of the arranged designated patch, the larger the size of each of the second multiple sections.

10. The printing device according to claim 7, further comprising a conveyor configured to convey the printing medium in first direction,
wherein the patch chart includes third multiple sections formed by dividing the first area in the first direction, each of the third multiple including fourth multiple sections divided in a direction intersecting the first direction, one of the designated patch being arranged in each of the fourth sections, the fourth multiple sections being configured in such a manner that the higher the priority of the designated color of the arranged designated patch, the larger the size of each of the fourth multiple sections.

11. The printing device according to claim 10,
wherein, in the patch chart, an arrangement pattern of the fourth multiple sections in each of the third multiple sections differs from each other between adjacent third sections.

12. The printing device according to claim 7, further comprising a carriage configured to move the head in a second direction,
wherein the patch chart includes fifth multiple sections formed by dividing the first area into a number of designated colors in the second direction, one of the designated patch being arranged in each of the fifth sections, the fifth multiple sections being configured in such a manner that the size of each of the fifth multiple sections is larger as the priority of the designated color of the arranged designated patch is higher.

13. A printing method of controlling a printing device having a head including nozzles configured to eject ink and is configured to print, with use of the ink, an image having a plurality of pixels on a printing medium, an input device configured to receive information designating a pixel in the image,
wherein the printing method comprises:
judging a priority of a designated color of a designated pixel designated by the information designating on the pixel;
determining one of conditions including (a) a number of designated patches of the designated color, (b) sizes of the designated patches of the designated color, and (c) the number and sizes of the designated patches of the designated color, based on the priority judged by the judging; and
printing a patch chart containing the designated patch according to the one of the conditions determined in the determining on the printing medium.

14. A non-transitory computer-readable storage medium for a printing device having a head including nozzles configured to eject ink and is configured to print, with use of the ink, an image having a plurality of pixels on a printing medium, an input device configured to receive information designating a pixel in the image and a computer, the non-transitory computer-readable storage medium containing computer-executable instructions which cause, when executed by the computer, the printing device to perform:
judging a priority of a designated color of a designated pixel designated by the information designating the pixel;
determining one of conditions including (a) a number of designated patches of the designated color, (b) sizes of the designated patches of the designated color, and (c) the number and sizes of the designated patches of the designated color, based on the priority judged by the judging; and
printing a patch chart containing the designated patch according to the one of the conditions determined in the determining on the printing medium.

* * * * *